Sept. 10, 1957  D. LIEBERMAN  2,805,644
POULTRY COOPS
Filed March 7, 1957  4 Sheets-Sheet 4
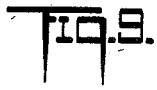
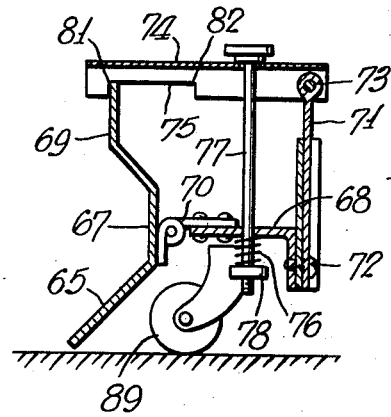
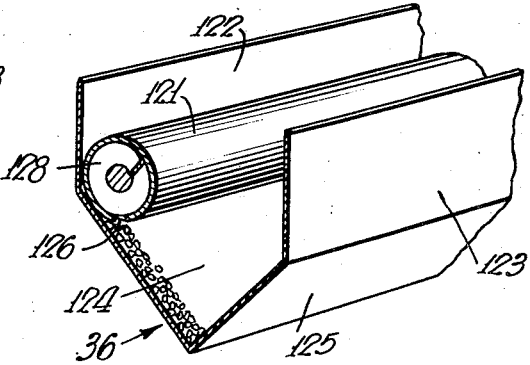
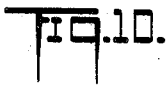
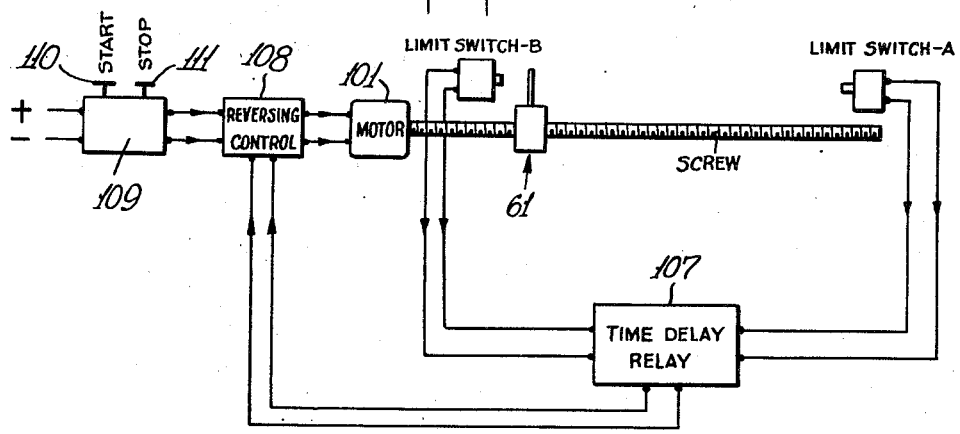
INVENTOR
David Lieberman
BY
Benjamin Sweedler
ATTORNEY

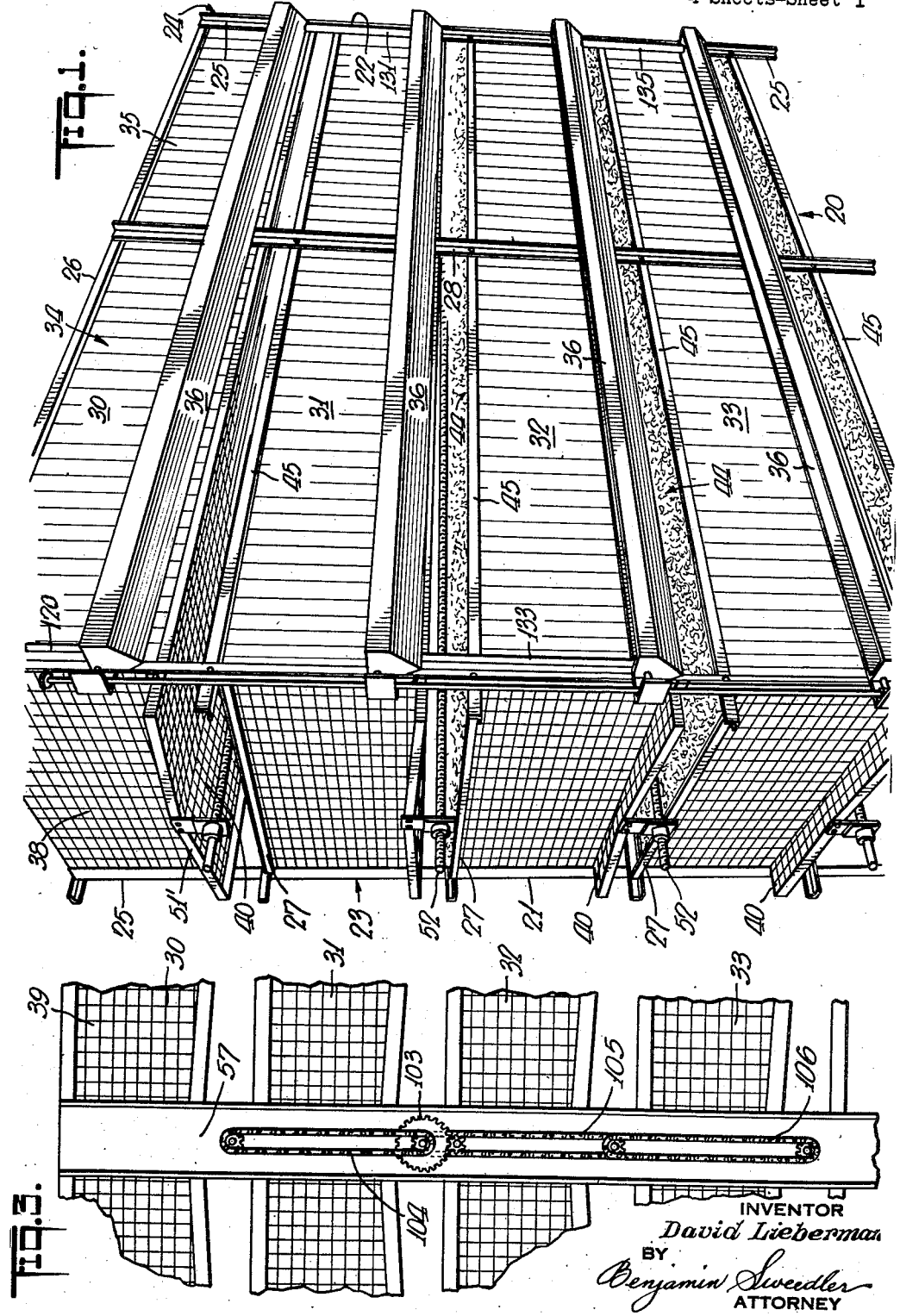

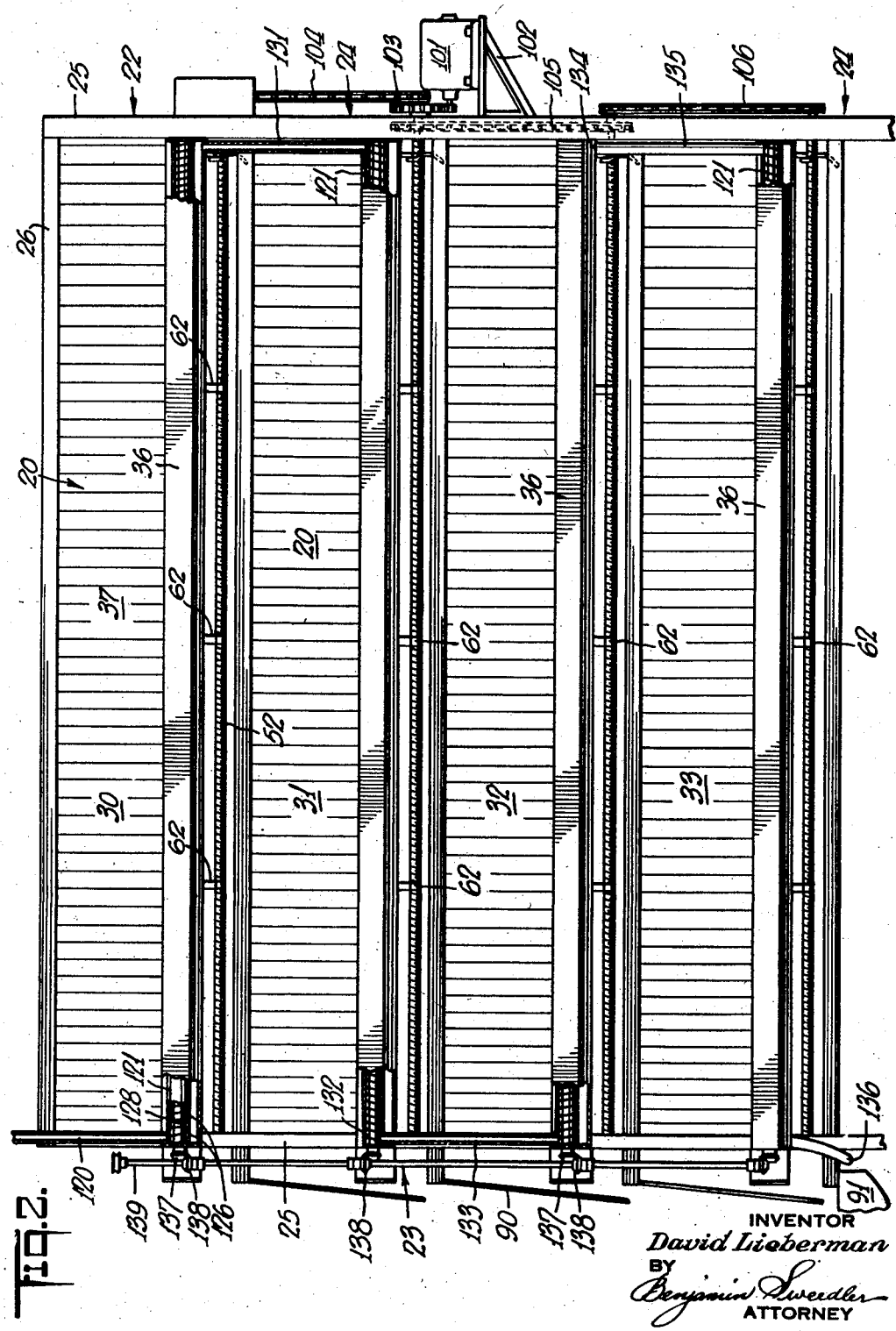

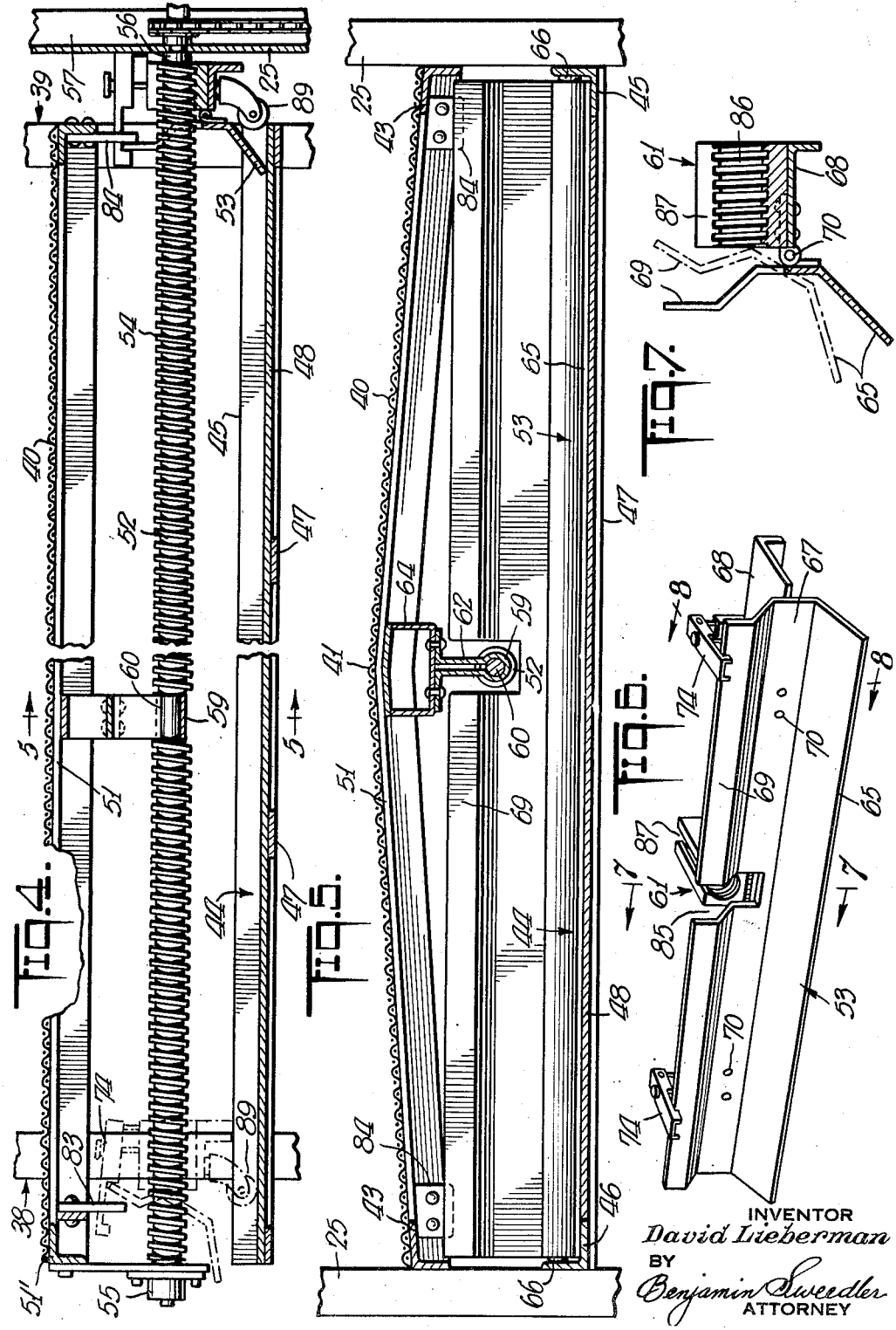

United States Patent Office 2,805,644
Patented Sept. 10, 1957

2,805,644

POULTRY COOPS

David Lieberman, Rivervale, N. J.

Application March 7, 1957, Serial No. 644,586

8 Claims. (Cl. 119—22)

This invention relates to poultry coops, cages or housings constructed, arranged and designed to provide for the economical and efficient raising of the poultry, minimizing the labor required so to do. More particularly, this invention pertains to poultry housing equipped with automatic means for continuously supplying grain or other feed to the feed troughs associated with each coop and means for automatically removing the droppings as they fall from the poultry, thus maintaining sanitary conditions with consequent improvement in the health and quality of the poultry raised and with a saving in the labor required to effect this desirable result.

It is among the objects of the present invention to provide poultry housing of compact design permitting the raising of a relatively large number of poultry in a given space, which housing provides for the automatic removal of the droppings and thus maintains sanitary conditions.

It is another object of the present invention to provide such poultry housing in which automatic means are provided for supplying the feed to the poultry in desired amount approximately equal to its rate of consumption by the poultry.

Still another object of the present invention is to provide such poultry housing equipped with automatic means for removing the droppings which housing equipment is simple in design and durable in operation requiring little maintenance.

Other objects and advantages of this invention will be apparent from the following detailed description thereof.

For a fuller understanding of the nature and objects of this invention reference should be had to the following detailed description taken with the accompanying drawings, in which:

Figure 1 is a perspective view of a poultry housing embodying this invention;

Figure 2 is a vertical section through the poultry housing of Figure 1 taken in a plane extending along the length of the housing;

Figure 3 is a fragmentary elevational view of one end of the housing showing the chain drive for the scrapers which effect removal of the droppings;

Figure 4 is a fragmentary vertical section taken in a plane running the length of the housing and showing on an enlarged scale, as compared with the scale of Figures 1, 2 and 3, the threaded shaft for effecting reciprocable movement of a scraper;

Figure 5 is a vertical section taken in a plane passing through line 5—5 on Figure 4;

Figure 6 is a perspective view of a scraper which effects removal of the droppings;

Figure 7 is a vertical section through a mounting for a scraper taken in a plane indicated by line 7—7 on Figure 6;

Figure 8 is a vertical section through a scraper taken in a plane indicated by line 8—8 on Figure 6;

Figure 9 is a fragmentary perspective view of one of the feed troughs showing the novel mechanism for supplying grain or other feed to this trough to continuously maintain therein a limited supply of feed in position accessible to the poultry within the housing; and Figure 10 shows diagrammatically and schematically an arrangement of relay, motor and control for effecting the reciprocatory movement of a scraper.

For convenience in description, the opposite sides constituting the long sides of the housing have been referred to above and will be referred to hereinafter as the sides of the housing, and the surfaces of the housing at right angles to the sides have been referred to above and will be referred to hereinafter as the ends of the housing.

Referring first to Figures 1, 2 and 3 of the drawings, there is illustrated a housing of oblongular shape constituted of sides 20, 21 and ends 22 and 23. This housing comprises a strong rigid frame 24 formed by vertical corner channel bars 25, longitudinally extending channels 26, transverse channels 27, and suitably braced by intermediate channels including channels 28 at the front side 20. In the embodiment of the invention shown in the drawings, this frame is oblongular in shape. It is of a height to support four coop sections in superimposed relationship. It will be understood, however, that the shape of the frame and the coop sections carried thereby may be varied as desired. In lieu of the four coop sections in superimposed relationship a greater or lesser number may be employed.

Since each of the coop sections 30, 31, 32 and 33 is of the same construction, only one will be described in detail. Each section comprises a front wall 34, preferably formed by longitudinally extending suitably spaced wire rods 35, which rods extend substantially the full depth of the coop section. These wire rods 35 are spaced apart a distance such that the neck and head portion of the fowl or poultry, but not the body, may be projected through the openings defined by adjacent rods into feed trough 36 extending the full length of the cage section near the base thereof, as clearly shown in Figure 1. The construction of this feed trough will be described more fully hereinafter. The front grill of each coop section is removably suspended to permit easy removal and replacement of this grill. Thus, for example, each front grill or wall may be hingedly mounted to permit its movement for the purpose of opening a coop section to remove from and place fowl into the coop section. If desired, the front grill of each coop section may be of sectional construction, the separate sections being moveable separately to give access to only a portion of the coop section, depending upon the section of the front grill moved for this purpose.

The back wall 37 of each cage section is preferably formed of wire mesh material to provide for ventilation of the cages. End walls 38 and 39 are also formed of wire mesh, such as wire netting, suitably fastened to the framework. The top cage section 30 desirably has its top formed of wire mesh or other suitable material. In the case of each of the three lower cage sections 31, 32 and 33 the top of each cage is defined by the underside of the dropping tray disposed beneath the base of each of the cage sections thereabove.

The bottom or floor 40 of each cage section is constituted of a frame for removably supporting wire screen having suitably sized openings to permit droppings to fall therethrough, but small enough to provide a reasonably comfortable walking support for the poultry. This screen can be changed by simply removing it from its frame and replacing same with a different screen, having smaller or larger openings, depending upon the age of the poultry to be housed. This screen floor 40 is shaped, as best shown in Figures 1 and 5, so that it inclines downwardly in opposite directions from its longitudinal median 41 towards the sides of the cage. The frame supporting each floor comprises angle irons 43 fastened to the vertical channel bars 25 of the main frame 24 thus serving to further brace this frame. The pitch or angle of inclination of the floor 40 of each cage section, as best shown in Figure 5, is relatively gradual to avoid crowding the poultry toward the opposite sides of the cage, but still sufficient to tend to cause droppings and refuse to gravitate away from the longitudinal median 41 of the cage toward the sides and to fall through the openings in the floor 40 onto the dropping tray therebeneath. Also, the angle of inclination causes eggs to roll toward the sides when the coops are used to rear laying birds.

Each dropping tray 44 is supported by angle irons 45, 46 (Figure 5) suitably fastened to the channel bars 25 of the main frame 24. Each dropping tray desirably rests on suitable supports 47 positioned at spaced intervals along the length of the housing; these supports 47 may be suitably fastened to the main frame 24. Transite (cement-asbestos) or other corrosion resistant board 48, which extends between and rests on the angle irons 45, 46, forms an imperforate base or floor for the dropping tray 44. In the embodiment of the invention shown on the drawings, this corrosion resistant floor consists of a sheet of Transite of a width so that it extends from one angle iron 46 to the opposite angle iron 45, as clearly shown in Figure 5 and of a length equal to that of the dropping tray. The upstanding legs of the angle irons 45, 46 define the sides of the tray 44 and provide side walls which prevent droppings from falling out of the tray when the scraper, hereinafter described, effects the automatic removal of the droppings from each tray.

The floor 40 of each cage is supported at spaced intervals along its length by supporting angle irons 51 which are shaped the same as the floor, i. e., inclined gradually downwardly toward the opposite ends of the housing from the longitudinal median and are joined at their ends to the frame supporting the screen floor 40. Each of the floor frames may be suitably fastened as by bolting or riveting to the longitudinally extending bars 26, thus further bracing the main frame 24. Angle irons 51' define the ends of each floor frame. Mounted on one or more of the angle irons 51 are suitable bearing supports for a threaded shaft 52 which effects reciprocatory motion of a scraper blade 53. One such scraper blade is disposed on each threaded shaft 52 beneath each of the cage sections.

Shaft 52 is provided with suitable threads 54 extending substantially the full length thereof. The ends of each shaft 52 are mounted for rotation in bearings 55 and 56. Bearing 55 is supported from an angle iron 51' defining the left hand end of floor 40, viewing Fig. 1, of a cage above the dropping tray. This edge, it will be noted from Figure 1, protrudes a short distance beyond the end wall 38 of the cage section thereabove. Bearing 56 is mounted on a vertically extending bracing channel bar 57. This channel bar is spaced from the walls of the cages a sufficient distance to permit each scraper blade 53 to engage the end of the dropping tray, as will be explained more fully hereinafter. Hence, movement of the scraper blade 53 sufficient to insure complete removal of the droppings takes place. In other words, each scraper blade when actuated moves beyond the planes defining the area within which droppings fall onto the dropping tray, thus insuring that droppings which fall near the ends of the cage onto the dropping tray therebeneath, are engaged by the scraper blade and are removed.

At one or more, preferably a plurality, of intermediate points along the length of each drive shaft 52 it is supported for rotation in a bearing 59. Each of these bearings 59 is designed to permit the split nut member 61 which is in threaded engagement with threads 54 and carries the scraper 53 to move past the bearing 59. For this purpose the bearing is supported in the base of parallel closely spaced channel bars 62 which are suitably bolted to the standard 64 secured to a supporting channel bar 51 on which the floor 40 rests. Bearing 59 supports for rotation the portion 60 of drive shaft 52, which portion 60 is of reduced diameter as compared with the diameter of the threads 54 on shaft 52.

Each scraper 53 as best shown in Figures 6 and 7 comprises a blade 65 of a length approximately equal to the width of the dropping tray in which it moves leaving a small clearance between its ends and the angle irons 45, 46 which clearance is indicated by the reference character 66 in Figure 5. The scraper blade 65 extends at an obtuse angle to the body portion 67 which, when the scraper is in position to have the scraping edge thereof in engagement with the floor of the dropping tray i. e. in the full line position shown in Figure 7, is substantially at right angles to the supporting bar 68 on which the scraping blade is mounted. Upstanding portion 69 of the scraper blade extends from the body portion 67 as shown in Figures 6 and 7 and effects movement of the scraper blade to scraping and non-scraping position as will be hereinafter explained. For this purpose the scraping blade is mounted on the supporting bar 68 by spaced hinges 70 best shown in Figure 7. These hinges have their leaves bolted, riveted or otherwise secured respectively to the body portion 67 of the scraper blade and the support 68. While in Figure 6, two such hinge mountings near the opposite ends of the scraper are shown, it will be understood that any desired number of hinges may be used.

Desirably a spring pressed clip is mounted near each of the opposite ends of the scraper to hold the scraper blade firmly in its scraping position as well as in its non-scraping position elevated above the floor of the dropping tray into which position the scraper blade is moved when it is being returned from the end of its travel along the floor of the dropping tray to a position where it again moves to effect the removal of droppings from the dropping tray. These clip holding members, as clearly shown in Fig. 8, involve a support 71 secured at its lower end at 72 to the supporting plate 68 of the scraper. Pivoted at 73 to the upper end of support 71 is a clip 74 provided with a rectangular undercut portion 75 on its underside. Clip 74 is always pressed downwardly about its pivot 73 by means of a spring 76 on rod 77 passing through an opening in clip 74 and also through an aligned opening in the supporting plate 68. A nut 78 is adjustable on the threaded end of bolt 77 to adjust the tension of spring 76. Downward pressure is thus exerted on clip 74 to firmly hold the scraper blade in the scraping position shown in Figure 8 in which position the upstanding portion 69 of the scraper blade locks in the corner 81 of the clip 74. When the scraper blade is moved to its non-scraping position, as will hereinafter be more fully described, the upstanding portion 69 locks in the corner 82 of clip 74 and is firmly held by this clip in this position.

Movement of each hinged scraper blade 53 is effected by stops 83 and 84 (Figure 4) mounted on the main frame at the limits of travel of each scraper blade 53 in its movement back and forth in the dropping tray above which it is positioned. In Figure 5 two such stops 84 are shown at one end of the path of travel of the scraper blade 53. It will be understood only one stop or more than two can be used at each end of the path of travel of the scraper blade 53. Stop 83 as best shown in Figure 4 is positioned a short distance before the terminal end of the dropping tray 44 which as clearly shown in Figure 1 extends beyond the ends of the coop thereabove. Stop 84 at the opposite end of each coop is positioned just beneath the end of the coop. Drive shaft 52 as clearly shown in Figure 4 extends beyond the stop 84.

Upstanding portion 69 of the scraper blade is formed with an opening 85 just in front of split nut 61 so that when the blade 65 is moved about its hinges 70, opening 85 accommodates the front end of split nut 61 and the latter does not interfere with pivotal movement of the scraper blade 65. Split nut 61 is threaded as at 86 which threads 86 mesh or are in threaded engagement with the threads on drive shaft 52. The opening 87 in split nut 61 is of a width such that the vertical supporting channels 62 can pass therethrough. In this way, when the driving shaft 52 is rotated, movement of the scraper blade 53 takes place, say, from right to left (Figure 4), the opening 87 in the split nut 61 permitting this latter member to move past the supporting channel bars 62 for bearings 59.

Threads 86 in split nut 61 are of sufficient longitudinal extent so that when nut 61 passes supporting channels 62, nut 61 at all times remains in threaded engagement with the threads 54 thus providing the necessary driving force to effect movement of the scraper blade 53. In other words, the length of split nut 61 is appreciably greater than the longitudinal extent of bearing 59 in which the reduced intermediate portions 60 of drive shaft 52 are mounted for rotation. When the scraper reaches a position so that the upstanding portion 69 engages stop 83, further movement effects pivotal movement of the blade about the hinges 70 into the dotted line position shown at the extreme left of Figure 4. Upon reversal of the direction of rotation of the driving shaft 52, as hereinbelow described, the scraper blade 65 through its driving split nut member 61 moves from left to right viewing Figure 4. When the upstanding portion 69 of the scraper blade abuts stop 84 the blade is again moved about its hinges 70 and returned to the full line position shown at the right of Figure 4.

In order to facilitate movement of the scraper 53 as hereinabove described, the supporting plate 68 has mounted thereon casters or rollers 89 which roll on the floor of the dropping tray. It will be understood that the supporting plate 68 may be provided with any desired number of such castors; usually two, one near each of the opposite ends of the supporting plate 68 will suffice.

As clearly shown in Figures 1 and 2 of the drawings the underside of each of the coop sections 30, 31, 32, and 33 are provided with a dropping tray therebeneath and each of these dropping trays is equipped with the mechanism hereinabove described for effecting reciprocal movement of a scraper blade from one end of the dropping tray to the other, running the full length of the coop section thereabove, thus automatically removing the droppings. Desirably a shield 90 is mounted in front of each of the coop sections forming a chute in front of each coop section through which the droppings discharge. From Figure 2 it will be apparent that the chute defined by each shield 90 of an upper coop section communicates at its lower end with the upper end of the chute of the coop section therebelow. The lowermost chute defined by the shield 90 communicates with a storage bin from which the droppings may be conveyed by a screw conveyor to a suitable disposal point. The shields 90 are shown in Figure 2 only; to avoid unnecessarily complicating Figure 1 they have not been shown in this figure.

Rotation of the drive shafts 52 beneath each of the coop sections desirably is effected by a reversing motor 101 mounted on standards 102, secured to the frame 24. The armature shaft of the motor 101 carries a pinion which drives a gear 103 driving a shaft which is in driving engagement with drive shaft 52 beneath the cage section 31. Through drive chains 104, 105, and 106 the other drive shafts 52 beneath each of the cage sections 30, 32, and 33 are driven. It will be understood that the chain drive shown in the drawings represents but one suitable type of drive and any other known drive may be employed.

Motor 101 is a conventional reversing motor equipped with a known time delay relay 107 (Figure 10), a reversing control 108 and a switch box 109 provided with a starting switch 110 and a stopping switch 111. The latter two switches are manually operated. Disposed at the ends of the path of travel of the scraper 53 are limit switches A and B respectively. These limit switches, for example, may be associated with the stops 83 and 84 so that when these stops are engaged to effect movement of the scraper about its hinges the switches are simultaneously operated.

Alternatively, they may be mounted on the machine to be engaged by the upstanding portion 69 of the scraper blade near the limits of its path of movement and thus actuated.

Each of the split nuts 61 carrying a scraper 53 associated with each of the dropping trays is positioned on its drive shaft 52 in the same relative position i. e. all of the split nuts 61 affecting actuation of the scrapers are disposed on their drive shaft 52 so that they engage the limit switches A or B, as the case may be, at substantially the same time. Thus, in operation when the operator presses the starting switch 110 current is supplied to the motor 101 which through the drive mechanism hereinabove described effects rotation of all the drive screws 52. This causes the scraper blades to move; assuming all of the scraper blades were at the extreme right hand position shown in Figure 4 when switch 110 was closed, from right to left. When the blades engage the limit switch A at the opposite end of the coops this switch is energized and flow of current to motor 101 is interrupted with consequent interruptions of rotation of the drive screws 52. The time delay relay 107, after a suitable interval, say a few seconds, automatically effects restoration of current to the motor 101 and the reversing control 108, thus causing the motor to rotate in the reverse direction. This will affect rotation of drive shafts 52 in reverse direction causing the scraper blades 53 to be returned to their original position, with the blades elevated in the dotted line position shown on Fig. 4, the elevation of the blades being affected by the stop 83 engaging the upstanding portions 69 of the blades and causing them to move about their hinges 70.

Upon return of the scrapers 53 to their initial position, limit switch B is engaged, cutting off power to motor 101 and again interrupting actuation of the drive screws 52. After the lapse of a suitable time interval for which the time delay relay 107 is set, this time delay relay restores the flow of current to motor 101 and reversing control 108, so that actuation of motor 101 in reverse direction relative to the immediately preceding direction of rotation takes place. In other words, upon each actuation of either of the limit switches A or B, the direction of rotation of the motor is reversed and a suitable time interval is provided by the time delay relay for all rotating parts to come to rest before they are rotated in reverse direction. Whenever it is desirous to stop the operation of the scrapers, stop switch 111 is actuated manually, which interrupts the flow of current to the reversing control 108 and associated mechanism so that no actuation of the motor 101 takes place.

The motor, reversing control, time delay relay and limit switches may be of any conventional type now readily available commercially. It is believed unnecessary to describe the structure or operation of these known parts in greater detail.

Mounted on the front of the frame 24 is the feed mechanism for supplying grain or other feed continuously to each of the coop sections. This feed mechanism as best shown in Figures 1 and 2 comprises a storage bin (not shown) preferably mounted in elevated position above the top coop section 30 and communicating through a chute 120 with the cylindrical feed conduit 121 in the top feed trough. Each of the feed troughs are mounted on the frame 24 being riveted or otherwise suitably fastened thereto in a position near the base of a coop section 30, 31, 32 and 33, as the case may be, so that the feed therein is accessible to a fowl within the coop sections. As the troughs associated with each of the coop sections are of the same construction only one will be described in detail.

Referring to Figure 9, each trough is defined by parallel side walls 122 and 123 which merge at their bases into the intersecting inclined walls 124 and 125. Positioned along wall 122 which is the wall of the trough remote from the front wall of the coop section, is the cylindrical feed conduit 121 provided with a series of small closely spaced openings 126 in its base. Each feed conduit extends for the full length of the trough in which it is disposed. A feed screw 128 is mounted for rotation in each feed conduit.

One end of feed conduit 121 in the top trough communicates with chute 120 and the opposite end communicates with a chute 131 leading to the cylindrical feed conduit 121 in the trough immediately therebelow, i. e. the feed trough for coop section 31. The other end 132 of this feed conduit communicates through a connecting passageway 133 with the left hand end viewing Figure 2 of the feed conduit in the feed trough disposed in front of the coop section 32. The right hand end 134 of this feed conduit communicates through a connecting passageway 135 with the right hand end of the feed conduit in the trough for coop section 33. The left hand end, viewing Figure 2, of the bottom feed conduit 121 communicates through a feed channel 136 which leads to the storage bin from which the feed is supplied to the chute 120.

The feed screws 128 in each of the feed cylinders or conduits 121 in each of the troughs may be rotated by any suitable drive mechanism. In the form of the drive shown in Figure 2 a bevel gear 137 is fixed on the shaft of each feed screw and meshes with bevel gears 138 keyed on shaft 139 which is driven from a motor not shown.

In operation, grain or other feed is supplied continuously from the storage bin to the feed chute 120 from which it enters the topmost feed cylinder 121. The openings 126 in the base of each of the feed cylinders 121 are so dimensioned and the rate of rotation of the feed screws 128 therein is such, that a regulated flow of feed approximately equal to the rate of consumption by the fowl is supplied to each trough. Of course the exact rate of supply of the feed will depend on the number of fowl in each coop, their average rate of consumption of feed, etc. The rate is so chosen that feed is permitted to remain within trough only a few minutes so that spoilage thereof will not take place. It will be appreciated that the feed is supplied continuously to each of the feed conduits in each of the troughs, flowing in a zig zag direction from the topmost feed conduit to the next lower feed conduit until it passes through the lowermost feed conduit from which it is returned to the storage bin. In its flow through the feed cylinders or conduits 121, the feed flows through the openings 126 therein supplying the feed to the troughs continuously at a rate approximately equal to its rate of consumption.

It will be noted the present invention provides poultry housing of compact design, permitting the efficient raising of a relatively large number of fowl in a given space, which housing is so constructed and designed as to provide for the automatic removal of the droppings, thus maintaining sanitary conditions and also to provide for the automatic supply of feed to the poultry in amount approximately equal to its rate of consumption by the poultry. Both of these automatic features result in a marked saving in labor.

It will be further noted that the housing embodying this invention is simple in design, exceptionally durable in operation and hence will require little maintenance expense. Moreover, the housing of this invention is unusually versatile in that with minor changes it can be used for raising different ages of poultry from one day old to maturity. As noted, the wire mesh floor in each cage is removeably mounted, so that wire mesh of any appropriate size may be employed. By mounting a false floor in a cage section and providing the feed trough with a filler strip to receive the feed at a higher level from the feed conduit 121, the housing will provide feed accessible to one-day old chicks, for example.

Since certain changes may be made in poultry housing and different embodiments of the invention could be made without departing from the scope thereof, it is intended that all matter contained in above description or shown in the accompanying drawing shall be interpreted as illustrative and not in a limiting sense.

What is claimed is:

1. Poultry housing in combination a coop having a foraminous floor; a tray beneath said floor to catch the droppings; a scraper moveable in one direction through said tray to remove said droppings and in the opposite direction to return said scraper to one end of said tray with the scraper in non-scraping position; and means for effecting said movement of said scraper comprising a drive screw mounted for rotation in bearings, at least one of said bearings being disposed intermediate the length of said drive screw, and means for supporting said scraper, said supporting means being in threaded engagement with said screw, said supporting means being provided with an opening permitting movement of said supporting means past said intermediate bearing, in the movement of said scraper in both scraping and non-scraping positions.

2. Poultry housing as defined in claim 1 in which said foraminous floor is inclined downwardly from its longitudinal median toward the opposite sides of said coop.

3. Poultry housing in combination a coop having a foraminous floor, a tray beneath said floor to catch the droppings, said tray projecting at its ends beyond the ends of said coop, a hinged scraper moveable back and forth in said tray for effecting removal of said droppings in one direction of movement through said tray and for return to its original starting position for its path of movement to effect said removal of said droppings, a threaded drive shaft for effecting said movement of said scraper, threaded nut member supporting said scraper and in threaded engagement with said drive shaft, bearings in which the ends of said threaded drive shaft is mounted for rotation, at least one bearing for an intermediate portion of said drive shaft, said last mentioned bearing being suspended from the underside of the coop thereabove and supported by closely spaced vertical supports, and said threaded nut member being provided with a slot along its full length which receives said vertical supports and thus permits said nut member to move past said intermediate bearing support.

4. Poultry housing as defined in claim 3 having stops at the opposite ends of the path of travel of said scraper, means on said scraper for engaging said stops, one of said stops effecting pivotal movement of said scraper from a position in which said scraper is effective to scrape the floor of said tray to a position in which said scraper is disposed in non-scraping position and the other of said stops being effective to return said scraper from its non-scraping position to its scraping position and means for holding said scraper in said positions.

5. Poultry housing, in combination, a plurality of coop sections in superimposed position, each coop section comprising a foraminous floor, a dropping tray disposed beneath said floor, a threaded drive shaft mounted beneath each floor and above each dropping tray, bearings for the ends of said shaft in which said shaft is mounted for rotation, at least one bearing intermediate the ends of said shaft in which said shaft is mounted for rotation, a scraper blade, and means for supporting said scraper blade in threaded engagement with said shaft, said means being constructed and arranged to move on said threaded shaft past said intermediate bearing to move said scraper blade back and forth along the length of said dropping tray.

6. Poultry housing as defined in claim 5 in which each coop section has stops near the opposite ends of the path of movement of said scraper, and said scraper is hingedly mounted on said supporting means, one of said stops when engaged by said scraper moving said scraper about said hinges to move it to a non-scraping position and the other of said stops when engaged by said scraper restoring the latter to its scraping position.

7. Poultry housing as defined in claim 5 having along the front of each coop section a feed trough, a feed conduit having spaced openings thereon in each feed trough running the full length thereof, the said conduits being interconnected for series flow therethrough, the base of each conduit having spaced feed openings therein and a feed screw in each conduit for effecting feed of material therethrough.

8. Poultry housing, in combination, a plurality of longitudinally extending substantially oblongular coop sections arranged in superimposed relation, one above the other, each coop section comprising a foraminous floor, a longitudinally extending dropping tray disposed beneath the floor of each coop section and defining the top of a coop section therebeneath, a scraper blade mounted for movement back and forth in the space between each of said dropping trays and the floor of the coop section thereabove, said scraping blade being of a length approximately equal to the width of the dropping tray in which it is disposed, means for moving said scraper blade with its scraping edge in engagement with the dropping tray in which it is disposed in one direction throughout substantially the full length of said dropping tray, means for raising the said scraping edge out of contact with said dropping tray when said scraping blade reaches the end of its path of travel in said one direction, means for returning the scraping blade with said scraping edge in said raised position, through the same path of travel but in the opposite direction through the said space between said dropping tray and the floor of the coop section thereabove and means for restoring the scraping edge of said blade to its scraping position when it reaches the end of its path of travel in the said opposite direction, said means for effecting movement of said scraper blade including a threaded shaft in threaded engagement with a threaded member carrying said scraper blade and a reversing motor for rotating said threaded shaft in opposite directions to effect said movements of said scraper blade in said one and in said opposite directions.

References Cited in the file of this patent

UNITED STATES PATENTS 2,294,025   Dagg _____ Aug. 25, 1942